(12) United States Patent
Sung et al.

(10) Patent No.: US 9,462,261 B2
(45) Date of Patent: Oct. 4, 2016

(54) 2D/3D SWITCHABLE AUTOSTEREOSCOPIC DISPLAY APPARATUS AND METHOD

(75) Inventors: Gee Young Sung, Daegu-si (KR); Yun-Tae Kim, Suwon-si (KR); Du-Sik Park, Suwon-si (KR); Dong Kyung Nam, Yongin-si (KR); Ju Yong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2113 days.

(21) Appl. No.: 12/385,759

(22) Filed: Apr. 17, 2009

(65) Prior Publication Data

US 2010/0079584 A1    Apr. 1, 2010

(30) Foreign Application Priority Data

Sep. 30, 2008  (KR) .................. 10-2008-0095704

(51) Int. Cl.
*H04N 13/04*     (2006.01)
*G02F 1/1335*    (2006.01)
*G06T 15/00*     (2011.01)
*G06F 3/038*     (2013.01)
*G09G 3/36*      (2006.01)
*G02B 27/22*     (2006.01)

(52) U.S. Cl.
CPC ...... *H04N 13/0454* (2013.01); *G02B 27/2214* (2013.01); *H04N 13/0404* (2013.01)

(58) Field of Classification Search
CPC ..... H04N 13/04; G02F 1/1335; G06T 15/00; G06F 3/038; G09G 3/36
USPC ........................................................ 348/52
See application file for complete search history.

(56) References Cited

U.S. PATENT DOCUMENTS 7,864,422 B2 *  1/2011  Jung ............................ 359/463
7,911,439 B2 *  3/2011  Bayrle et al. ................. 345/102
2005/0030301 A1 *  2/2005  Harrold et al. ............... 345/204
2005/0179827 A1 *  8/2005  Scharenbroch et al. ........ 349/16

FOREIGN PATENT DOCUMENTS

| EP | 2166402 A2 | 3/2010 |
|---|---|---|
| JP | 05-284542 | 10/1993 |
| KR | 2003-0036765 | 5/2003 |
| KR | 2008-0000425 | 1/2008 |
| KR | 10-2008-0073929 | 8/2008 |
| WO | WO 2005/011291 | 2/2005 |

OTHER PUBLICATIONS

European Search Report dated Jun. 9, 2010, from European Patent Application No. EP 09161765.4.
"7.4: Design of 2D/3D Switchable Displays," W.L. IJzerman et al., SID 05 Digest, 2005, pp. 98-101.
Korean Office Action dated Aug. 29, 2014 from Korean Patent Application No. 10-2008-0095704, 14 pages.

* cited by examiner

*Primary Examiner* — Phuoc Nguyen
*Assistant Examiner* — Kishin G Belani
(74) *Attorney, Agent, or Firm* — NSIP Law (57) ABSTRACT

A two dimensional/three dimensional (2D/3D) switchable autostereoscopic display apparatus and method to selectively display a 2D image and a 3D image using two displays and a convertible lens. When outputting the 2D image, the 2D/3D switchable autostereoscopic display apparatus may control a first display to output a white image/white light, control a second display to output an image, and control an electrical diffuser lens of the convertible lens to be switched off and the white image to be diffused so as to operate as a backlight. When outputting the 3D image, the 2D/3D switchable autostereoscopic display apparatus may control the first display to output an image, control the second display to be switched off to be in a transparent state, control the electrical diffuser lens of the convertible lens to be switched on to be in the transparent state, and control the lenticular lens to output the 3D image.

22 Claims, 9 Drawing Sheets

2D/3D SWITCHABLE AUTOSTEREOSCOPIC DISPLAY APPARATUS AND METHOD

CROSS-REFERENCE TO RELATED APPLICATIONS

This application claims the benefit of Korean Patent Application No. 10-2008-0095704, filed on Sep. 30, 2008, in the Korean Intellectual Property Office, the disclosure of which is incorporated herein by reference.

BACKGROUND

1. Field

One or more embodiments relate to a switchable autostereoscopic display apparatus and method switchable between two dimensional (2D) and three dimensional (3D) modes, and more particularly, to such a 2D/3D switchable autostereoscopic display apparatus and method which may selectively display one of a 2D image and a 3D image using the same two displays with a convertible lens therebetween.

2. Description of the Related Art

Since a three dimensional (3D) image display may be conventionally required to display both a 3D image and a two dimensional (2D) image, a 2D/3D switchable image display technique is desired. Such 2D/3D switchable image display technique may include an autostereoscopy technique with a parallax barrier and lenticular lens, for example.

As such an example, a lenticular lens may be attached to a front side of a Liquid Crystal Display (LCD) in a display designed to display 3D images. In this instance, the LCD is a Flat Panel Display (FPD). Light from pixels to be displayed on an LCD may be output to each predetermined location behind a lenticular lens, due to characteristics of the particular lenticular lens. The lenticular lens provides images of different viewpoints, that is, left and right column image information, to left and right eyes of a user, and thereby may provide a 3D effect. Here, a lenticular lens refracts light of an image to left and right viewpoints. Accordingly, a lenticular lens is a desirable component of a 3D image display. However, a 2D image is not displayable when the lenticular lens is attached to the LCD, such as those attached to a front side of the LCD. Accordingly, research has been desirably conducted for a way to selectively display a 2D image and a 3D image while still using a lenticular lens.

A 2D/3D switchable lenticular lens may adjust refractive indexes along the inside and outside of the lens using a Liquid Crystal (LC) to convert a 2D image and a 3D image. It has been desirably found by inventors of the present invention that when refractive indexes along the inside and outside of lens are identical the lenticular lens may not appropriately function as a lens, and thus a 2D image may actually be generated. Conversely, when refractive indexes of an inside and outside of the lens are different, the lenticular lens may operate as conventionally intended, resulting in a 3D image being generated. Here, when refractive indexes are not appropriately adjusted, a quality of 2D and 3D images may also be deteriorated.

SUMMARY

One or more embodiments may provide a two dimensional/three dimensional (2D/3D) switchable autostereoscopic display apparatus and method.

One or more embodiments may also provide an image display apparatus and method which may selectively display one of a 2D image and a 3D image using a convertible lens and the same two displays.

According to one or more embodiments, there may be provided a two dimensional/three dimensional (2D/3D) switchable autostereoscopic display apparatus, the apparatus including a display unit including a first display and a second display, and configured to selectively output one of a 2D image and a 3D image through a convertible lens located at a position between the first display and the second display, the convertible lens being configured to selectively operate as a lenticular lens when the 3D image is output, and a control unit to control the first display, second display, and convertible lens to selectively output the one of the 2D image and the 3D image, with the control of the selective outputting including controlling the selective operation of the convertible lens.

The convertible lens may include the lenticular lens to refract light of an incident image to a plurality of viewpoints, and an electrical diffuser lens to selectively pass and diffuse the image depending on an electric signal.

the electrical diffuser lens may further be located in front of or at a back of the lenticular lens and made of Polymer Dispersed Liquid Crystal (PDLC).

During an outputting of the 2D image, the control unit may control the first display to output light, control the second display to output the 2D image, and control an electrical diffuser lens of the convertible lens to operate in a state that operates as a diffuser so a corresponding diffusing of the light of the first display meets requirements for being a backlight for the second display.

During an outputting of the 3D image, the control unit may control the first display to output light representing the 3D image, control the second display to operate in a transparent state, control an electrical diffuser lens of the convertible lens to operate in a transparent state, and control the lenticular lens of the convertible lens to refract light of the light representing the 3D image to a plurality of viewpoints to output the 3D image.

The first display may correspond to any one of a Liquid Crystal Display (LCD), Plasma Display Panel (PDP), Organic Light Emitting Diode (OLED), and Projection display. Further, the second display may correspond to any one of an LCD and OLED.

According to one or more embodiments, there may be provided a two dimensional/three dimensional 2D/3D switchable autostereoscopic display method, the method including selectively outputting light through a first display, selectively controlling an electrical diffuser lens of a convertible lens to diffuse the light output by the first display, with the diffused light meeting requirements for being a backlight to a second display, and selectively controlling the second display to be in one of a transparent state or an image generating state to output a 2D image, the outputting of the 2D image being made through provision of the backlight when the electrical diffuser lens is controlled to operate as the diffuser and the first display is controlled to output the light.

The method may further include selectively controlling an outputting of the light representing the 3D image by the first display, the electrical diffuser lens of the convertible lens to operate in a transparent state, and the second display to operate in the transparent state, when the 3D image is set to be output through the second display, and refracting the light representing the 3D image through a lenticular lens of the convertible lens, and outputting the 3D image through the second display.

The method may still further include receiving of a request for an output of an image, controlling the electrical diffuser lens to operate as the diffuser and controlling the convertible lens to not refract light for 3D imaging, when the output of the 2D image is determined to have been requested, and controlling the electrical diffuser lens to not operate as the diffuser, controlling the second display to operate in the transparent state, and controlling the 3D image to be output through the second display, when an output of the 3D image is determined to have been requested.

The convertible lens may be located between the first display and the second display.

In addition, the convertible lens may include a lenticular lens to refract light of an incident image to a plurality of viewpoints, and the electrical diffuser lens to selectively pass and diffuse the image depending on an electric signal.

The electrical diffuser lens may be located in front of or at a back of the lenticular lens and made of Polymer Dispersed Liquid Crystal (PDLC). Further, the lenticular lens may refract the light of the incident image provided from the first display to the plurality of viewpoints.

In addition, the first display may correspond to any one of a Liquid Crystal Display (LCD), Plasma Display Panel (PDP), Organic Light Emitting Diode (OLED), and Projection display. Further, the second display may correspond to any one of an LCD and OLED.

According to one or more embodiments, there may be provided a display, the display including a first display for three-dimensional (3D) image generation, a second display for two-dimensional (2D) image generation, and a selective 3D transmission panel, optically positioned between the first display and the second display, configured to selectively operate with a transparent aspect for incident light from the first display during 3D image generation and to differently operate as a light diffuser for incident light from the first display during 2D image generation.

The selective 3D transmission may panel further include a convertible lens to modify trajectories of incident light from the first display to generate a 3D image upon output of the second display operating in a transparent state.

The convertible lens may include a lenticular lens. In addition, the display may include a control unit to control the first display, second display, and the selective transmission panel lens to selectively output one of a 2D image and a 3D image.

According to one or more embodiments, there may be provided a display method, including selectively controlling a display device to selectively be in one of a first mode, controlling a transmission panel between a first and second displays to diffuse light from the first display and controlling the second display to modify incident light to generate a 2D image, and a second mode, controlling the first display to generate light representing a 3D image, controlling the transmission panel to modify the generated light representing the 3D image for 3D viewing, and controlling the second display to pass through the modified light for output of the 3D image differently from the modification of the incident light to generate the 2D image.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
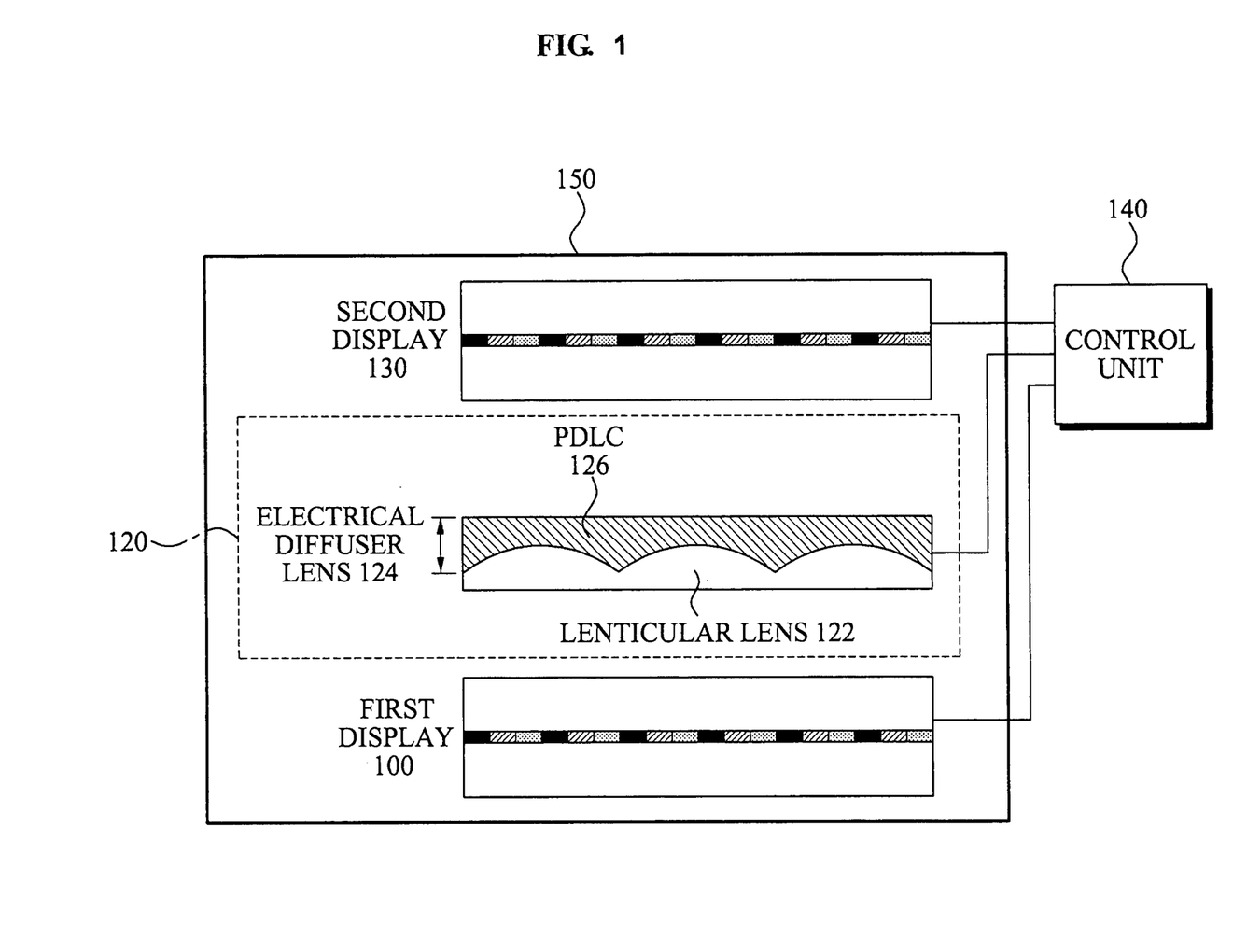
FIG. 1 illustrates a configuration of a two dimensional/three dimensional (2D/3D) switchable autostereoscopic display apparatus, according to one or more embodiments.

FIG. 1 illustrates a configuration of a two dimensional/three dimensional (2D/3D) switchable autostereoscopic display apparatus, according to one or more embodiments. Referring to FIG. 1, in such an embodiment, the 2D/3D switchable autostereoscopic display apparatus may include a control unit 140 and a display unit 150. The display unit 150 may include a first display 100, a convertible lens 120, and a second display 130, for example.

The first display 100 may output an image during a 3D image outputting mode, and output a white image and be operated as a backlight during a 2D image outputting mode, e.g., under control of the control unit 140. Here, the white image, or any subsequent modified light, would result in light meeting requirements for being such a backlight, e.g., consistent with a backlight for use with a corresponding second display 130. The first display 100 may correspond to any one of a Liquid Crystal Display (LCD), a Plasma Display Panel (PDP), an Organic Light Emitting Diode (OLED), a Projection display, etc., for example.

The second display 130 may be controlled to selectively output an image during the 2D image outputting mode, and be operated in a transparent state during a 3D image outputting mode. The second display 130 may correspond to any one of an LCD and OLED, for example, noting that alternative embodiments are equally available.

The convertible lens 120 may convert a 2D image and a 3D image, and be located at a position between the first display 100 and the second display 130. In an embodiment, the convertible lens 120 may include a lenticular lens 122 and an electrical diffuser lens 124, again noting that alternative embodiments are equally available.

Light from pixels of the first display 100 may be controlled to output along predetermined directions under control of the lenticular lens 122, i.e., due to defined characteristics of the lenticular lens 122. Specifically, light from the pixels of the first display 100 may be controlled to respectively output from a particular location toward particular locations, e.g., each of left and right eyes of an observer, as only an example. Accordingly, the observer may look at images from two different viewpoints at the same time, and thus a 3D effect may be obtained. That is, the lenticular lens 122 may refract light of an image into two, that is, left and right, viewpoints, and thus, for example, each of the left and right eyes of the observer may observe different images.

Here, a viewpoint may indicate a location from where an observer would be observing an object. The refracting of the light of the image may indicate refracting light of an image to enable each different image to be observed at a plurality of locations.

The electrical diffuser lens 124 may be located in front of or behind the lenticular lens 122, and can be controlled to electrically control the display of 2D and 3D images, e.g., under the control of the control unit 140. In addition, the electrical diffuser lens 124 may be used to remove a moiré pattern generated due to such two displays when providing the output of the 2D image. When outputting the 2D image, the first display 100 may act as a backlight, and the electrical diffuser lens 124 may further function as a diffuser. Accordingly, the electrical diffuser lens 124 can be used to improve the uniformity of the backlight. Here, the electrical diffuser lens 124 may electrically adjust/control the diffuser operation.

As noted, the potentially corrected moiré pattern may be an interference pattern created when two grids are overlaid. The moiré pattern may be generated where bright lines are overlapped among bright lines, and dark lines are overlapped among dark lines. Also, the moiré pattern may be generated where a bright line is overlapped with a dark line. Accordingly, in an embodiment, when using overlapped displays, lines are continuously connected and thus another moiré pattern may be generated, and correction of the same may be desirable.

Figure 2A:
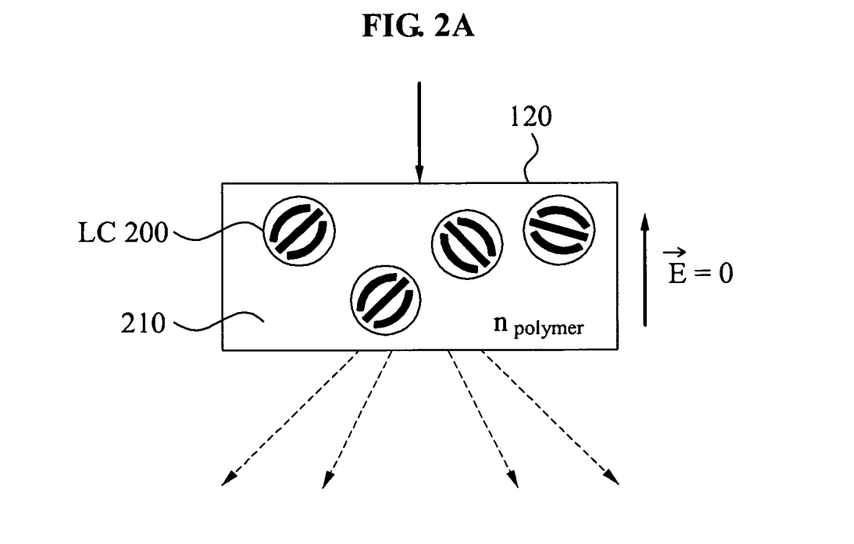
FIGS. 2A and 2B illustrate a configuration of an example Polymer Dispersed Liquid Crystal (PDLC) in a 2D/3D switchable autostereoscopic display apparatus, according to one or more embodiments.
Figure 2B:
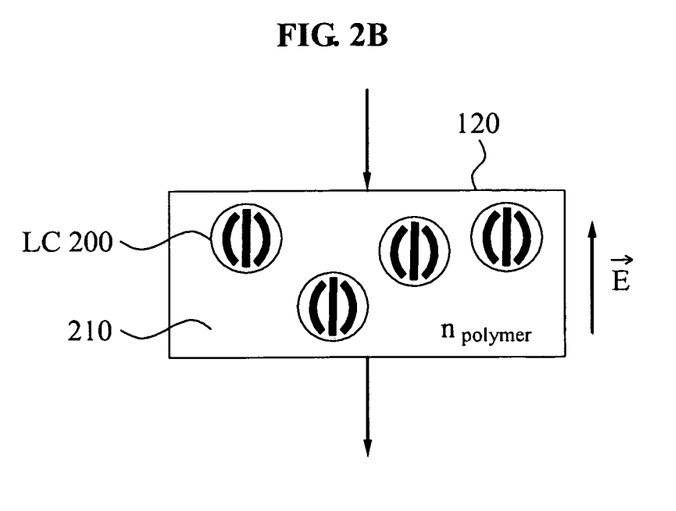

A configuration of the electrical diffuser lens 124 is described in detail with reference to FIGS. 2A and 2B. FIGS. 2A and 2B illustrate a configuration of a Polymer Dispersed Liquid Crystal (PDLC) 126 in a 2D/3D switchable autostereoscopic display apparatus, according to one or more embodiments. The electrical diffuser lens 124 may be made of the PDLC 126, noting that alternative embodiments are equally available.

In an embodiment, a plurality of Liquid Crystals (LCs) 200 may be caused to be surrounded by a polymer 210 in the PDLC 126, again only as an example. A refractive index of the polymer 210 may be isotropic with respect to an incident polarized light source. That is, in an embodiment, the refractive index of the polymer 210 may be fixed at all times. In an embodiment, thus, the plurality of LCs 200 surrounded by the polymer 210 may further be anisotropic. Here, the refractive indexes of the plurality of LCs 200 may be different in each direction, for example. Accordingly, as illustrated in FIG. 2A, when an electric field is not applied and each of the plurality of LCs 200 is randomly oriented, the refractive index of the polymer 210 may be different from a refractive index of each of the plurality of LCs 200.

Accordingly, the incident light may be scattered, which is referred to as a scattering state. Conversely, when an electric field is applied, each of the plurality of LCs 200 is aligned according to the electric field. In this instance, when the refractive index of each of the plurality of LCs 200 is identical to the refractive index of the polymer 210, that is, the refractive indexes are all the same, the incident light may not be scattered and pass through, as illustrated in FIG. 2B. Such a state can be referred to as a transparent state.

An alignment process for determining a direction of an initial LC, may not be required for the PDLC 126. Specifically, in an embodiment, the PDLC 126 may be manufactured by combining the plurality of LCs 200 and a monomer, inserting the combination into a gap between two glasses, and converting the monomer into the polymer 210, and thus it may not be necessary to consider the uneven alignment.

The control unit 140 may control the first display 100, the convertible lens 120, and the second display 130 to selectively generate the output the 2D image or 3D image, e.g., such as based on a request from a user.

The control unit 140, first display 100, the convertible lens 120, and the second display 130 when outputting the 2D image are described in detail with reference to FIG. 3.

Figure 3:
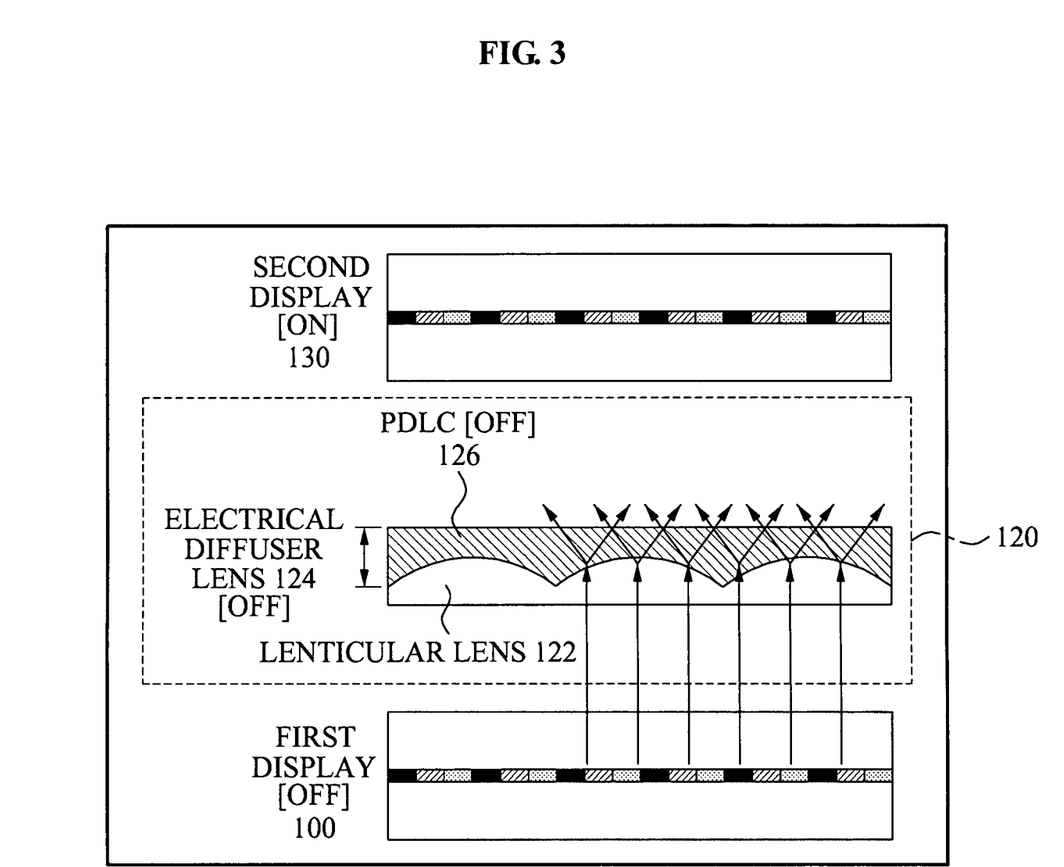
FIG. 3 illustrates a sectional view of a display unit when outputting a 2D image, according to one or more embodiments.

FIG. 3 illustrates a sectional view of a display unit 150 when outputting a 2D image, according to one or more embodiments.

Referring to FIG. 3, when a request for an output of the 2D image is received from a user, for example, a control unit 140 may control a first display 100 to output a white image/white light and control a second display 120 to output the image. Also, the control unit 140 may control an electrical diffuser lens 124 of a convertible lens 120 to be switched off and the white image to be diffused and operate as a backlight, and thereby may output the 2D image.

The control unit 140, the first display 100, the convertible lens 120, and the second display 130, when outputting a 3D image, are described in detail with reference to FIG. 4.

Figure 4:
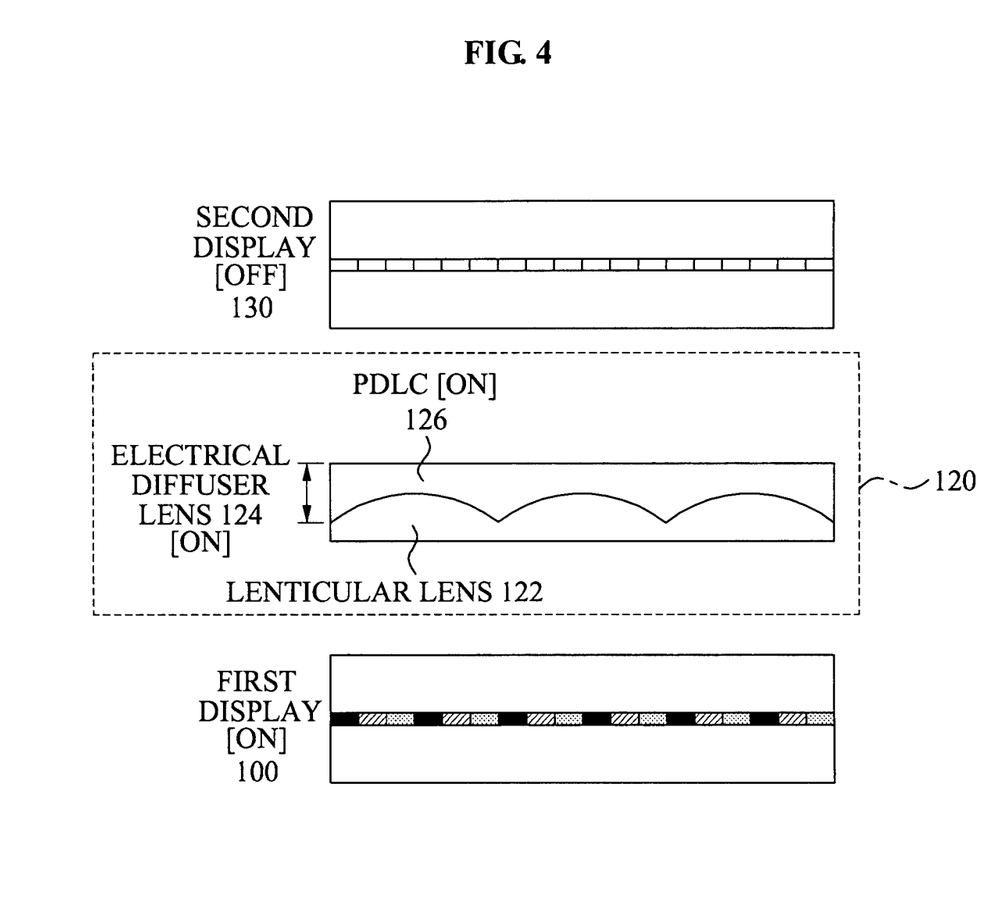
FIG. 4 illustrates a sectional view of a display unit when outputting a 3D image, according to one or more embodiments.

FIG. 4 illustrates a sectional view of a display unit 150 when outputting a 3D image, according to one or more embodiments.

Referring to FIG. 4, when a request for an output of the 3D image is received from a user, a control unit 140 may control a first display 100 to output an image and control a second display 120 to be switched off to be in a transparent state. Also, the control unit 140 may control an electrical diffuser lens 124 of a convertible lens 120 to be switched on and to be in the transparent state, and control a lenticular lens 122 of the convertible lens 120 to refract light of the image, output through the first display 100, to a plurality of viewpoints to output the 3D image.

Figure 5:
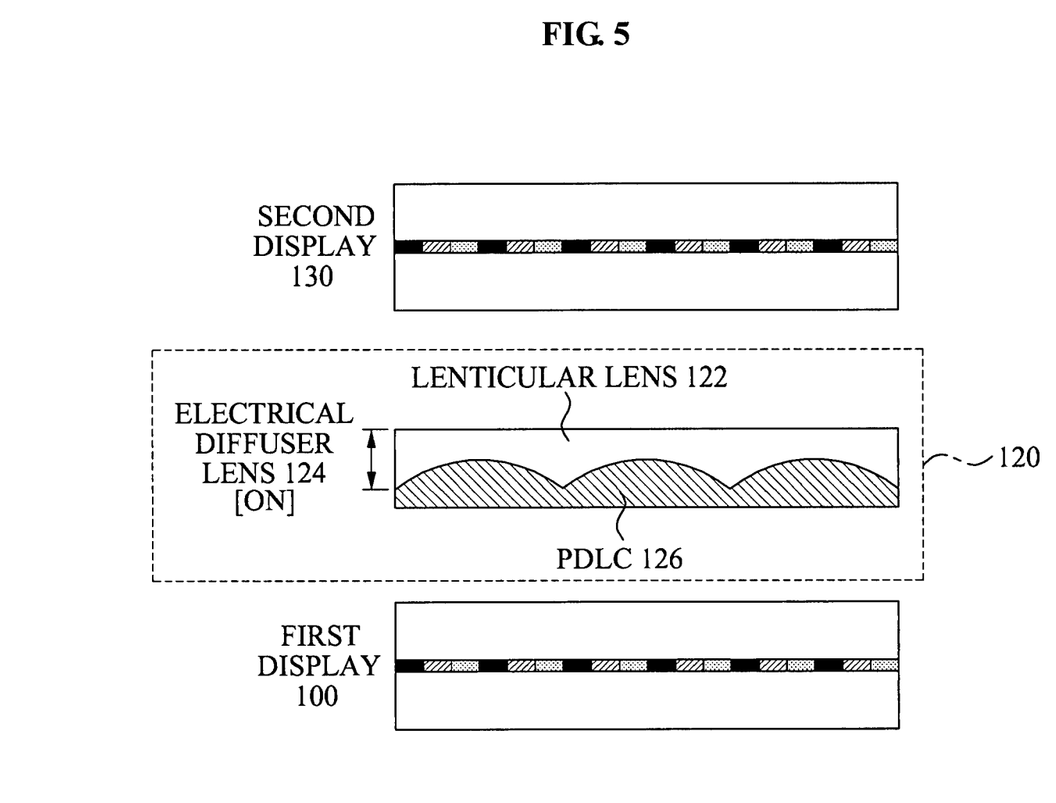
FIG. 5 illustrates a configuration of a display unit of a 2D/3D switchable autostereoscopic display apparatus, according to one or more embodiments.

FIG. 5 illustrates a configuration of a display unit 150 in a 2D/3D switchable autostereoscopic display apparatus, according to one or more embodiments.

When comparing FIG. 5 and FIG. 4, locations of a lenticular lens 122 and an electrical diffuser lens 124 in a convertible lens 120 are different. Also, the lenticular lens 122 is a concave lens in FIG. 5. However, an operation and effect of the lenticular lens 122 and the electrical diffuser lens 124 in FIG. 5 and FIG. 4 may be identical.

Figure 6:
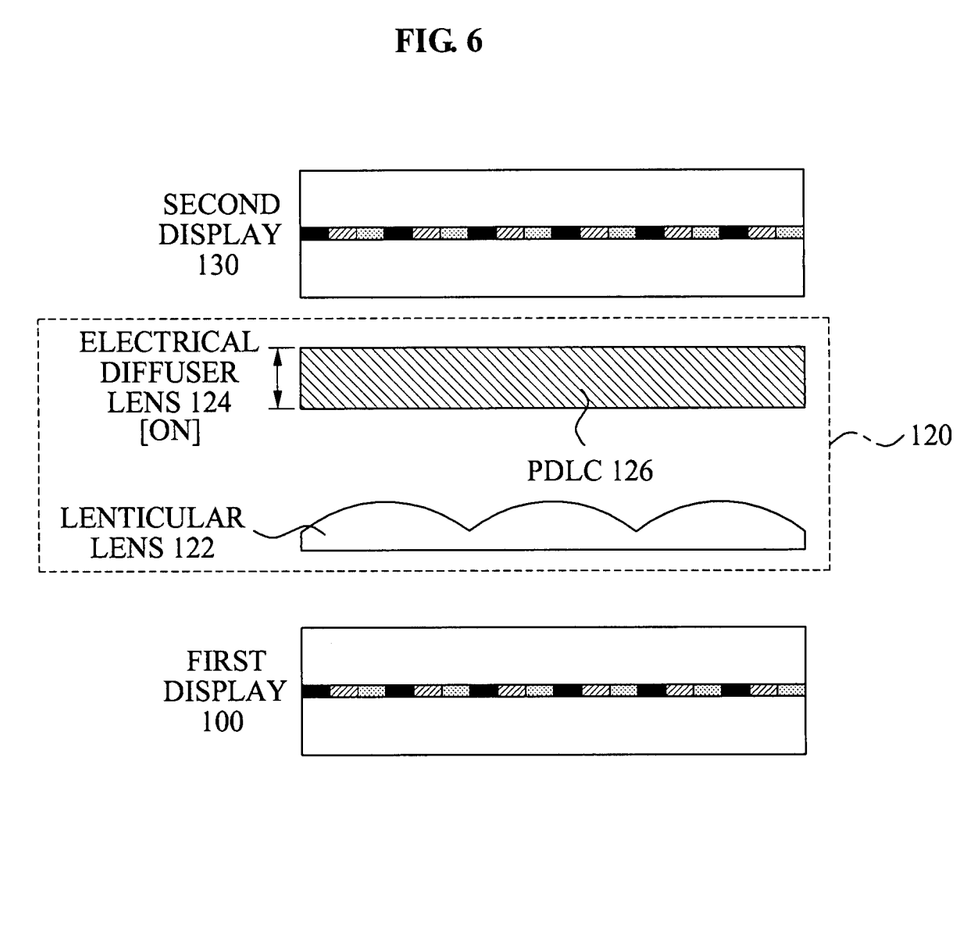
FIG. 6 illustrates a configuration of a display unit of a 2D/3D switchable autostereoscopic display apparatus, according to one or more embodiments.
Figure 7:
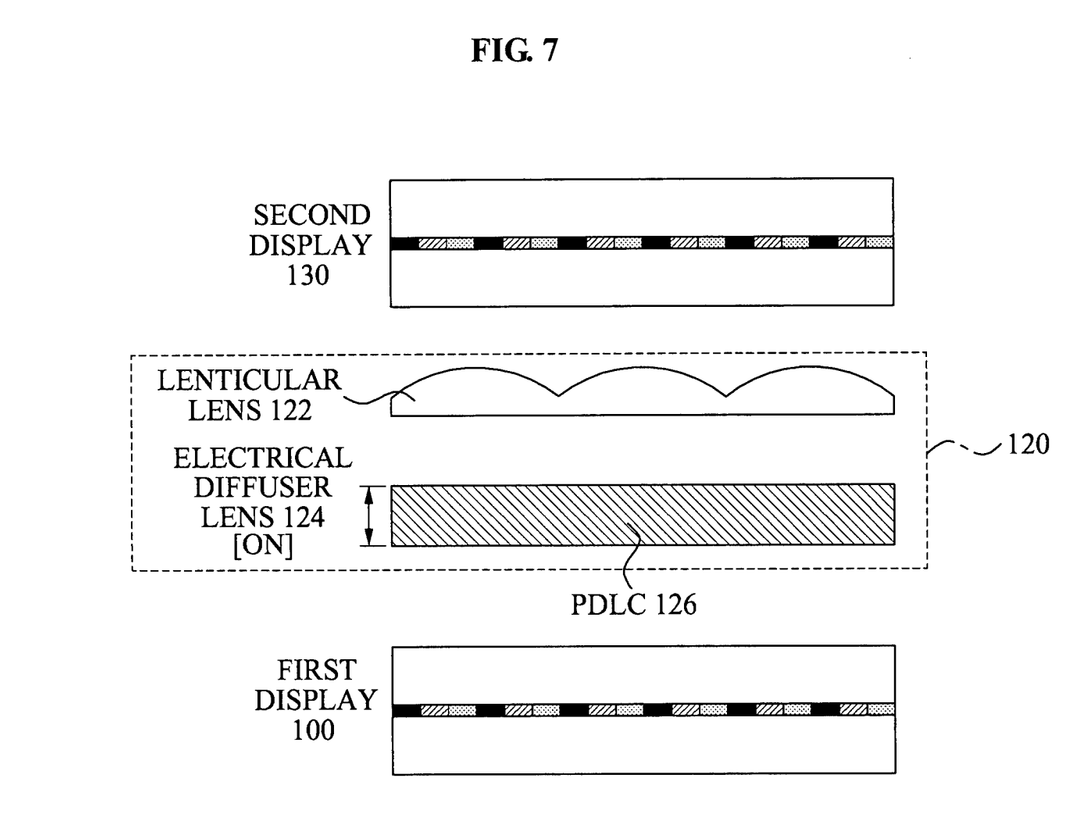
FIG. 7 illustrates a configuration of a display unit in a 2D/3D switchable autostereoscopic display apparatus, according to one or more embodiments.

Other configurations of the display unit 150 in the 2D/3D switchable autostereoscopic display apparatus are illustrated in FIG. 6 and FIG. 7.

FIGS. 6-7 illustrate configurations of a display unit 150 in a 2D/3D switchable autostereoscopic display apparatus, according to one or more embodiments.

A lenticular lens 122 and an electrical diffuser lens 124 in a convertible lens 120 are illustrated as being separated in FIG. 6 and FIG. 7. However, although the configurations of the display unit 150 are different in FIG. 6 and FIG. 7, an operation and an effect of the lenticular lens 122 and the electrical diffuser lens 124 may also be identical, and thus a detailed description is omitted.

Hereinafter, a 2D/3D switchable autostereoscopic display method is described in detail with reference to FIG. 8.

Figure 8:
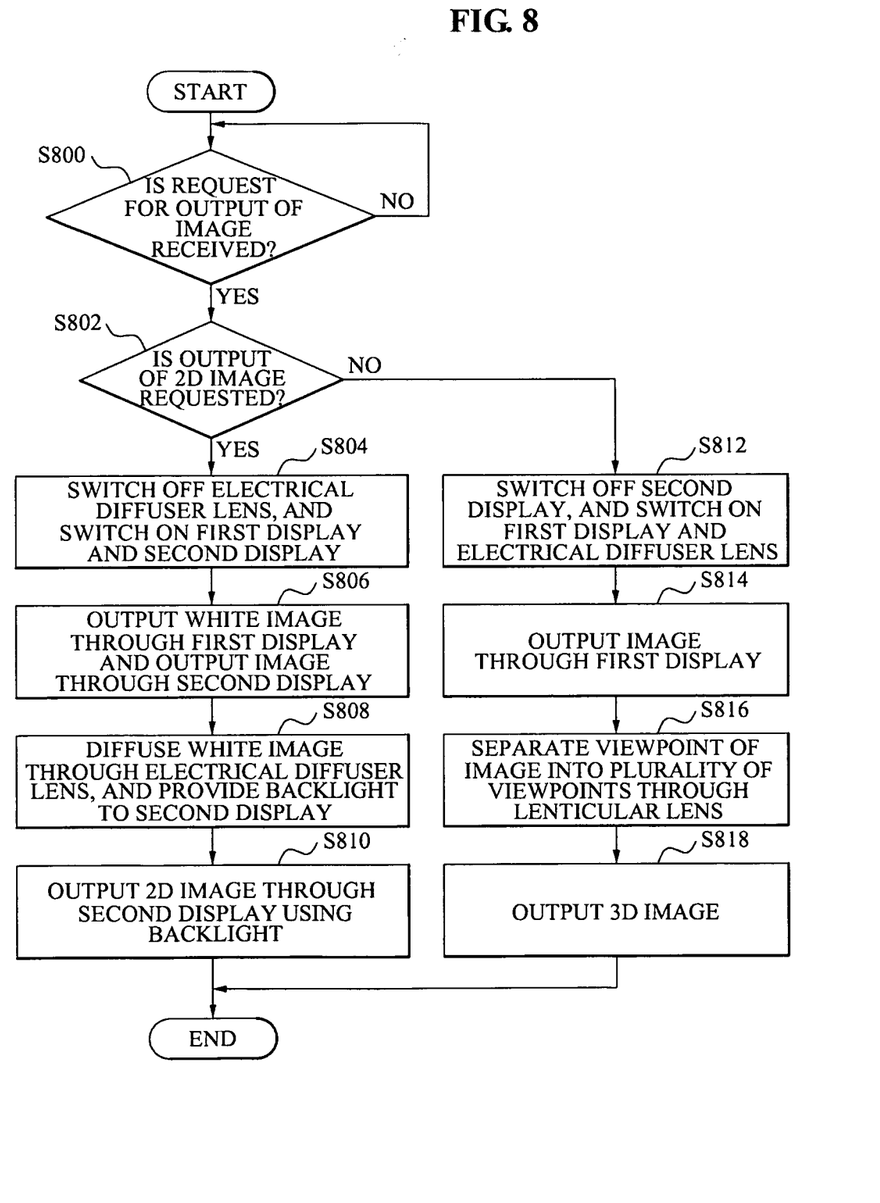
FIG. 8 illustrates an operation of selectively outputting a 2D image and a 3D image for a 2D/3D switchable autostereoscopic displaying, according to one or more embodiments.

FIG. 8 illustrates an operation of selectively outputting a 2D image and a 3D image, according to one or more embodiments.

Referring to FIG. 8, in an embodiment, in operation S800, it may be determined whether a request for an output of an image is received. In operation S802, it may be determined whether an output of a 2D image is requested. Here, regarding the request for an output of a 2D or 3D image, and whether the corresponding request is made, additional and/or alternative embodiments are equally available Thus, in an embodiment, in operation S804, an electrical diffuser lens of a convertible lens may be switched off and a first display and a second display may be turned on, when the output of the 2D image is requested as a result of the determining in operation S802, for example. In operation S806, a white image may be output through the first display and output an image through the second display.

In operation S808, the white image of the first display may be diffused through the electrical diffuser lens of the convertible lens, and operate as a backlight to the second display. In operation S810, the 2D image may be output through the second display using the provided backlight.

In operation S812, when an output of a 3D image is set, e.g., as determined to be requested in operation S802, the second display may be switched off so as to be set to a transparent state, and the electrical diffuser lens of the convertible lens may be switched on to operate in the transparent state. In operation S814, an image may be output through the first display. In operation S816, light of the image, output through the first display, may be refracted to a plurality of viewpoints through the lenticular lens, since the electrical diffuser lens is in the transparent state. In operation S818, the 3D image with the refracted light may be output through the second display in the transparent state.

A 2D/3D switchable autostereoscopic display method, or aspects thereof, according to the above-described one or more embodiments, may be implemented by one or more processing devices and/or recorded in computer-readable media including processing or program instructions to control such a one more processing elements to implement various operations embodied by a computer. The media may also include, alone or in combination with the instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform instructions, such as read-only memory (ROM), random access memory (RAM), flash memory, and the like. Examples of instructions include at least both machine code, such as produced by a compiler, and files containing higher level code that may be executed by the computer using an interpreter.

According to one or more embodiments, a 2D/3D switchable autostereoscopic display apparatus may include a display unit that includes a first display and a second display, and to selectively output one of a 2D image and a 3D image through a convertible lens located at a position between the first display and the second display, and a control unit to control the first display, second display, and convertible lens to selectively output the at least one 2D image and the 3D image. In this instance, the convertible lens may be operated as a lenticular lens when the 3D image is desired to be output.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A two dimensional/three dimensional (2D/3D) switchable autostereoscopic display apparatus, the apparatus comprising:
    a display unit including a first display and a second display, and configured to selectively output one of a 2D image and a 3D image through a convertible lens located at a position between the first display and the second display, the convertible lens being configured to selectively operate as a lenticular lens when the 3D image is output,
    wherein the convertible lens includes an electrical diffuser lens and a lenticular lens; and
    a control unit to control the first display, second display, and convertible lens to selectively output the one of the 2D image and the 3D image, with the control of the selective outputting including controlling the selective operation of the convertible lens,
    wherein, when the control unit selectively outputs the 3D image, the control unit controls the first display to output light representing the 3D image, controls the second display to operate in a transparent state, controls the electrical diffuser lens to operate in a transparent state, and controls the lenticular lens to refract light of the light representing the 3D image to a plurality of viewpoints to output the 3D image.

2. The apparatus of claim 1, wherein the lenticular lens refracts light of an incident image to a plurality of viewpoints; and
    the electrical diffuser lens selectively passes and diffuses the image depending on an electric signal.

3. The apparatus of claim 2, wherein the electrical diffuser lens is located in front of or at a back of the lenticular lens and is made of Polymer Dispersed Liquid Crystal (PDLC).

4. The apparatus of claim 1, wherein, during an outputting of the 2D image, the control unit controls the first display to output light, controls the second display to output the 2D image, and controls an electrical diffuser lens of the convertible lens to operate in a state that operates as a diffuser so a corresponding diffusing of the light of the first display meets requirements for being a backlight for the second display.

5. The apparatus of claim 1, wherein the first display corresponds to any one of a Liquid Crystal Display (LCD), Plasma Display Panel (PDP), Organic Light Emitting Diode (OLED), and Projection display.

6. The apparatus of claim 1, wherein the second display corresponds to any one of an LCD and OLED.

7. The apparatus of claim 2, wherein the electrical diffuser lens is disposed at a position between the first display and the lenticular lens.

8. A two dimensional/three dimensional 2D/3D switchable autostereoscopic display method, the method comprising:
   selectively outputting light through a first display;
   selectively controlling an electrical diffuser lens of a convertible lens to diffuse the light output by the first display, with the diffused light meeting requirements for being a backlight to a second display;
   selectively controlling the second display to be in one of a transparent state or an image generating state to output a 2D image, the outputting of the 2D image being made through provision of the backlight when the electrical diffuser lens is controlled to operate as the diffuser and the first display is controlled to output the light; and
   selectively controlling the first display to output light representing the 3D image, the electrical diffuser lens of the convertible lens to operate in a transparent state, and the second display to operate in the transparent state, when the 3D image is set to be output through the second display.

9. The method of claim 8, further comprising:
   refracting the light representing the 3D image through a lenticular lens of the convertible lens, and outputting the 3D image through the second display.

10. The method of claim 9, further comprising receiving a request for an output of an image, controlling the electrical diffuser lens to operate as the diffuser and controlling the convertible lens to not refract light for 3D imaging, when the output of the 2D image is determined to have been requested, and controlling the electrical diffuser lens to not operate as the diffuser, controlling the second display to operate in the transparent state, and controlling the 3D image to be output through the second display, when an output of the 3D image is determined to have been requested.

11. The method of claim 8, wherein the convertible lens is located between the first display and the second display.

12. The method of claim 8, wherein the convertible lens comprises:
   a lenticular lens to refract light of an incident image to a plurality of viewpoints; and
   the electrical diffuser lens to selectively pass and diffuse the image depending on an electric signal.

13. The method of claim 12, wherein the electrical diffuser lens is located in front of or at a back of the lenticular lens and is made of Polymer Dispersed Liquid Crystal (PDLC).

14. The method of claim 12, wherein the lenticular lens refracts the light of the incident image provided from the first display to the plurality of viewpoints.

15. The method of claim 8, wherein the first display corresponds to any one of a Liquid Crystal Display (LCD), Plasma Display Panel (PDP), Organic Light Emitting Diode (OLED), and Projection display.

16. The method of claim 8, wherein the second display corresponds to any one of an LCD and OLED.

17. The method of claim 8, further comprising receiving a request for an output of an image, controlling the electrical diffuser lens to operate as the diffuser and controlling the convertible lens to not refract light for 3D imaging, when the output of the 2D image is determined to have been requested, and controlling the electrical diffuser lens to not operate as the diffuser, controlling the second display to operate in the transparent state, and controlling a 3D image to be output through the second display, when an output of the 3D image is determined to have been requested.

18. A display, the display comprising:
   a first display for three-dimensional (3D) image generation;
   a second display for two-dimensional (2D) image generation; and
   a selective 3D transmission panel, optically positioned between the first display and the second display, configured to selectively operate with a transparent aspect for incident light from the first display during 3D image generation and to differently operate as a light diffuser for incident light from the first display during 2D image generation,
   wherein the second display is controlled to operate in a transparent state and the first display is controlled to output light representing a 3D image, when the 3D image is generated.

19. The display of claim 18, wherein the selective 3D transmission panel further comprises a convertible lens to modify trajectories of incident light from the first display to generate the 3D image upon output of the second display operating in the transparent state.

20. The display of claim 19, wherein the convertible lens includes a lenticular lens.

21. The display of claim 18, further comprising:
   a control unit to control the first display, second display, and the selective transmission panel lens to selectively output one of a 2D image and a 3D image.

22. A display method, comprising:
   selectively controlling a display device to selectively be in one of a first mode and a second mode,
   wherein the first mode comprises:
   controlling a transmission panel between first and second displays to diffuse light from the first display and controlling the second display to modify incident light to generate a 2D image,
   and the second mode comprises:
   controlling the first display to generate light representing a 3D image,
   controlling the transmission panel to modify the generated light representing the 3D image for 3D viewing, and
   controlling the second display to operate in a transparent state to pass through the modified light for output of the 3D image differently from the modification of the incident light to generate the 2D image.

* * * * *